US008219968B2

(12) United States Patent
O'Brien

(10) Patent No.: US 8,219,968 B2
(45) Date of Patent: Jul. 10, 2012

(54) DESIGNING COMPUTER PROGRAMS

(75) Inventor: Wayne Patrick O'Brien, Falls Church, VA (US)

(73) Assignee: Raytheon Company, Waltham, MA (US)

( * ) Notice: Subject to any disclaimer, the term of this patent is extended or adjusted under 35 U.S.C. 154(b) by 1487 days.

(21) Appl. No.: 10/621,772

(22) Filed: Jul. 17, 2003

(65) Prior Publication Data

US 2005/0015743 A1    Jan. 20, 2005

(51) Int. Cl.
*G06F 9/44*          (2006.01)
(52) U.S. Cl. ................... 717/104; 717/108; 717/116
(58) Field of Classification Search .................. None
See application file for complete search history.

(56) References Cited

U.S. PATENT DOCUMENTS

| | | | | |
|---|---|---|---|---|
| 5,159,687 A * | 10/1992 | Richburg | ...... | 717/106 |
| 5,442,792 A * | 8/1995 | Chun | ...... | 717/155 |
| 5,640,567 A * | 6/1997 | Phipps | ...... | 717/121 |
| 5,677,997 A * | 10/1997 | Talatik | ...... | 706/45 |
| 5,699,310 A * | 12/1997 | Garloff et al. | ...... | 717/108 |
| 5,768,590 A * | 6/1998 | Kimura et al. | ...... | 717/106 |
| 5,815,717 A * | 9/1998 | Stack | ...... | 717/105 |
| 6,182,277 B1 * | 1/2001 | DeGroot et al. | ...... | 717/115 |
| 6,205,407 B1 * | 3/2001 | Testa et al. | ...... | 702/119 |
| 6,212,672 B1 * | 4/2001 | Keller et al. | ...... | 717/104 |
| 6,345,387 B1 * | 2/2002 | Morrison | ...... | 717/170 |
| 6,408,431 B1 * | 6/2002 | Heughebaert et al. | ...... | 717/106 |
| 6,748,588 B1 * | 6/2004 | Fraser et al. | ...... | 717/146 |
| 6,789,252 B1 * | 9/2004 | Burke et al. | ...... | 717/100 |
| 6,851,105 B1 * | 2/2005 | Coad et al. | ...... | 717/106 |
| 6,851,107 B1 * | 2/2005 | Coad et al. | ...... | 717/108 |
| 6,889,373 B2 * | 5/2005 | Fukase et al. | ...... | 717/106 |
| 6,973,640 B2 * | 12/2005 | Little et al. | ...... | 717/106 |
| 7,017,142 B1 * | 3/2006 | Ehnebuske et al. | ...... | 717/100 |
| 7,017,146 B2 * | 3/2006 | Dellarocas et al. | ...... | 717/106 |
| 7,020,660 B2 * | 3/2006 | Woodring | ...... | 717/122 |
| 7,028,288 B2 * | 4/2006 | Wall et al. | ...... | 717/109 |
| 7,032,210 B2 * | 4/2006 | Alloing et al. | ...... | 717/106 |
| 7,047,518 B2 * | 5/2006 | Little et al. | ...... | 717/108 |
| 7,076,766 B2 * | 7/2006 | Wirts et al. | ...... | 717/121 |
| 7,137,100 B2 * | 11/2006 | Iborra et al. | ...... | 717/106 |
| 7,171,646 B2 * | 1/2007 | Charisius et al. | ...... | 717/100 |
| 7,278,130 B2 * | 10/2007 | Iborra et al. | ...... | 717/101 |
| 7,305,656 B2 * | 12/2007 | Fish et al. | ...... | 717/105 |
| 7,350,191 B1 * | 3/2008 | Kompella et al. | ...... | 717/108 |
| 7,437,703 B2 * | 10/2008 | Wu | ...... | 717/100 |
| 7,463,263 B2 * | 12/2008 | Gilboa | ...... | 345/440 |
| 7,472,374 B1 * | 12/2008 | Dillman et al. | ...... | 717/102 |
| 7,555,742 B2 * | 6/2009 | Iborra et al. | ...... | 717/101 |
| 7,584,451 B2 * | 9/2009 | Iborra et al. | ...... | 717/101 |
| 7,610,575 B2 * | 10/2009 | Sproule | ...... | 717/103 |

(Continued)

OTHER PUBLICATIONS

EPO Communication pursuant to Article 94(3) EPC; Application No. 04 756 949.6-2211; Ref. JL5952, 6 pages, Feb. 13, 2009.

(Continued)

*Primary Examiner* — Tuan Dam
*Assistant Examiner* — Zheng Wei
(74) *Attorney, Agent, or Firm* — Cantor Colburn LLP

(57) ABSTRACT

Designing a computer program includes accessing invariant domain rules and displaying variable business rules. One or more business rules are selected in response to a user selection and are customized. The business rules are associated with a procedure, and the domain rules are associated with the procedure. A model representing the procedure is displayed, and a code corresponding to the procedure is generated to design a computer program.

33 Claims, 4 Drawing Sheets

U.S. PATENT DOCUMENTS

| | | | | |
|---|---|---|---|---|
| 7,711,670 | B2 * | 5/2010 | Roediger | 706/46 |
| 2002/0062475 | A1 * | 5/2002 | Iborra et al. | 717/108 |
| 2002/0091990 | A1 * | 7/2002 | Little et al. | 717/105 |
| 2002/0095654 | A1 * | 7/2002 | Fukase et al. | 717/106 |
| 2002/0100014 | A1 * | 7/2002 | Iborra et al. | 717/104 |
| 2002/0100022 | A1 * | 7/2002 | Holzmann | 717/126 |
| 2002/0104067 | A1 * | 8/2002 | Green et al. | 717/101 |
| 2002/0129331 | A1 * | 9/2002 | Zhang et al. | 717/106 |
| 2003/0110468 | A1 * | 6/2003 | Maki | 717/106 |
| 2003/0110472 | A1 * | 6/2003 | Alloing et al. | 717/122 |
| 2003/0167455 | A1 * | 9/2003 | Iborra et al. | 717/105 |
| 2003/0196168 | A1 * | 10/2003 | Hu | 715/513 |
| 2003/0229884 | A1 * | 12/2003 | Carr et al. | 717/101 |
| 2004/0003369 | A1 * | 1/2004 | Gonos | 717/100 |
| 2004/0015832 | A1 * | 1/2004 | Stapp et al. | 717/106 |
| 2004/0034846 | A1 * | 2/2004 | Ortal et al. | 717/111 |
| 2004/0064804 | A1 * | 4/2004 | Daniels et al. | 717/106 |
| 2004/0111702 | A1 * | 6/2004 | Chan | 717/113 |
| 2004/0133876 | A1 * | 7/2004 | Sproule | 717/105 |
| 2004/0139426 | A1 * | 7/2004 | Wu | 717/120 |
| 2004/0148586 | A1 * | 7/2004 | Gilboa | 717/108 |
| 2004/0249940 | A1 * | 12/2004 | Sohn et al. | 709/225 |
| 2006/0294500 | A1 * | 12/2006 | Chiang | 717/109 |
| 2007/0089103 | A1 * | 4/2007 | Iborra et al. | 717/141 |
| 2007/0168907 | A1 * | 7/2007 | Iborra et al. | 717/100 |
| 2007/0209031 | A1 * | 9/2007 | Ortal et al. | 717/104 |
| 2008/0209391 | A1 * | 8/2008 | Iborra et al. | 717/105 |
| 2008/0229278 | A1 * | 9/2008 | Liu et al. | 717/106 |
| 2009/0132995 | A1 * | 5/2009 | Iborra et al. | 717/106 |
| 2010/0050152 | A1 * | 2/2010 | Gilboa | 717/106 |
| 2010/0106546 | A1 * | 4/2010 | Sproule | 705/7 |
| 2010/0223211 | A1 * | 9/2010 | Johnson et al. | 706/11 |
| 2011/0010686 | A1 * | 1/2011 | Wilson et al. | 717/104 |

OTHER PUBLICATIONS

Japan Patent Office, Text of the Office Action, Application No. 2006-520281, transmitted to Baker Botts L.L.P. by foreign associate on Nov. 25, 2010, 32 pages (English and Japanese), Foreign Associate Letter dated Nov. 25, 2010.

Government of India, Patent Office Delhi, Sub: Hearing Notice in Reference of Application No. 504/DELNP/2006, 1 page, Apr. 20, 2011.

Communication from State of Israel—The Justice Office, The Patents Authority, First Office Action for Israeli Patent Application No. 173133 (Hebrew (2 pages)), Translation from Hebrew of the First Office Action, (2 pages), transmitted to Baker Botts, L.L.P. on Apr. 21, 2010.

Requisition by the Examiner in Accordance with Subsection 30(2) of the Patent Rules, Canadian Intellectual Property Office; Application No. 2,532,580; 2 pages, May 25, 2010.

State Intellectual Property Office of the People's Republic of China, Text of the First Office Action, Application No. 200480020539.8, transmitted to Baker Botts L.L.P. by foreign associate on Jun. 9, 2010, 8 pages (English and Chinese), Foreign Associate Letter dated Jun. 9, 2010.

Canada Intellectual Proerty Office, Office Action, Application No. 2,532,580, Jun. 27, 2011, 3 pages.

* cited by examiner

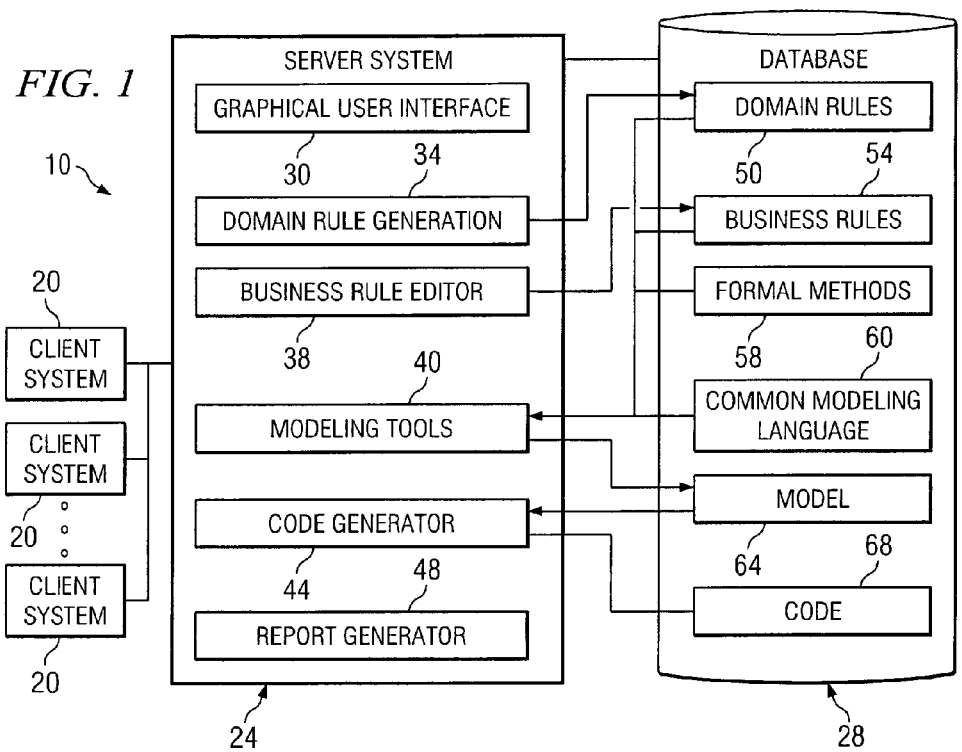

DESIGNING COMPUTER PROGRAMS

TECHNICAL FIELD OF THE INVENTION

This invention relates generally to the field of computers and more specifically to designing computer programs.

BACKGROUND OF THE INVENTION

Designing a computer program may involve generating a set of domain rules that set out the requirements for the computer program. Known techniques for designing computer programs typically involve generating a limited set of domain rules. A limited set of domain rules, however, may result in inefficient and ineffective computer program design. Consequently, know techniques for designing computer programs may be unsatisfactory in certain situations.

SUMMARY OF THE INVENTION

In accordance with the present invention, disadvantages and problems associated with previous techniques for designing computer programs may be reduced or eliminated.

According to one embodiment of the present invention, designing a computer program includes accessing invariant domain rules and displaying variable business rules. One or more business rules are selected in response to a user selection and are customized. The business rules are associated with a procedure, and the domain rules are associated with the procedure. A model representing the procedure is displayed, and a code corresponding to the procedure is generated to design a computer program.

According to another embodiment of the present invention, managing rules for designing a computer program includes accessing a number of rules. The rules are analyzed to separate domain rules from business rules, where each domain rule is invariant and each business rule is variable. The business rules are stored. A business rule is provided from the stored business rules in response to a request for the business rule.

Certain embodiments of the invention may provide one or more technical advantages. A technical advantage of one embodiment may be that a complete set of domain rules is determined prior to generation of the final code. The complete set may be used to define a problem space, providing for more efficient and effective design of a computer program.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of a system for designing a computer program;

FIG. 2 is a flowchart illustrating one embodiment of a method for designing a computer program;

DETAILED DESCRIPTION OF THE DRAWINGS

Figure 3:
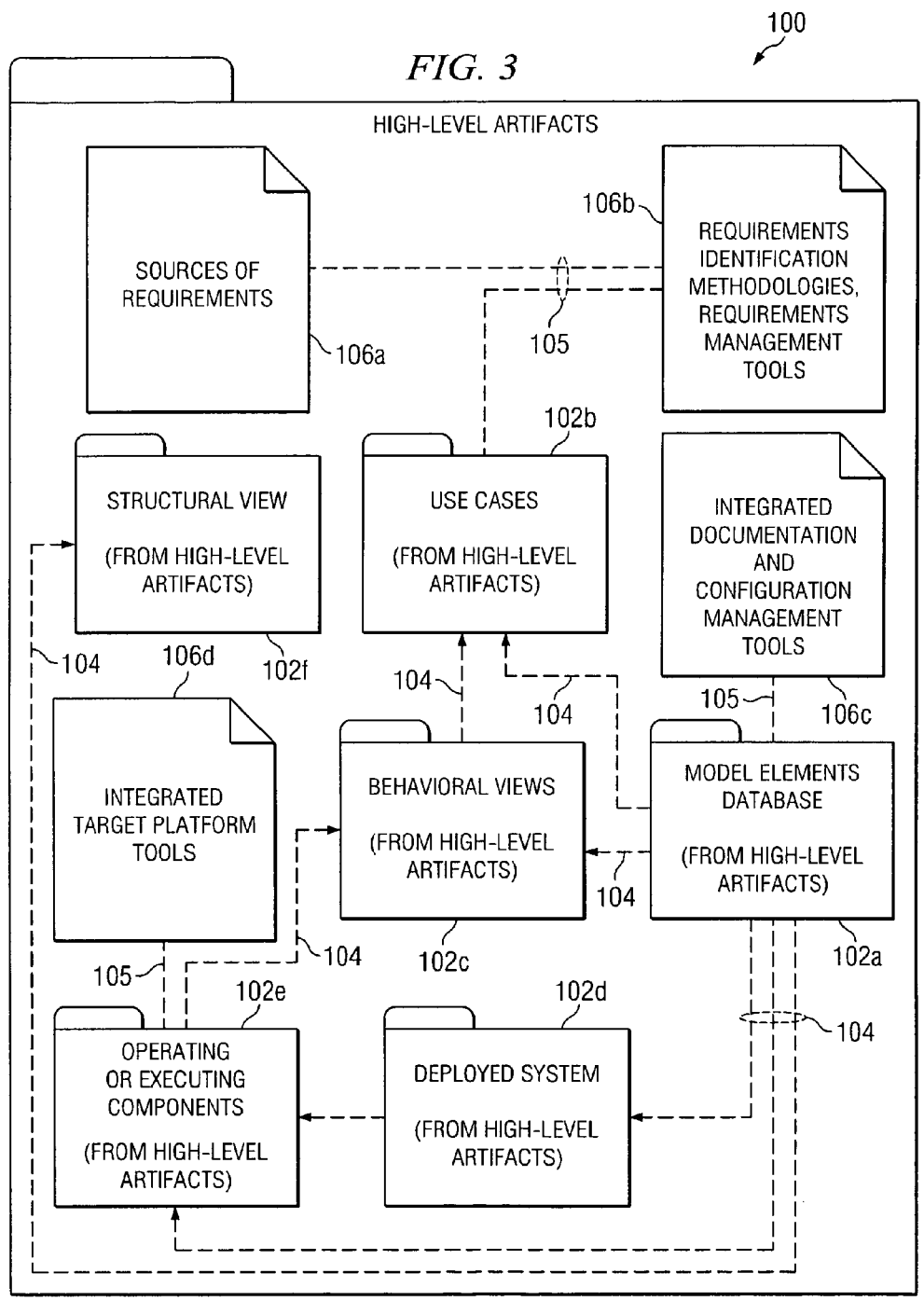
FIG. 3 is a diagram illustrating one embodiment of a relationship between high-level artifacts stored at database.

Embodiments of the present invention and its advantages are best understood by referring to FIGS. 1 through 6 of the drawings, like numerals being used for like and corresponding parts of the various drawings. As used in this document, "each" refers to each member of a set or each member of a subset of a set.

FIG. 1 is a block diagram illustrating one embodiment of a system 10 for designing a computer program. In general, system 10 is involved in the generation of a substantially complete set of domain rules to define the problem space of the computer program design. Invariant domain rules and customizable business rules are used to design the program.

According to the illustrated embodiment, system 10 includes one or more client systems 20, a server system 24, and a database 28 coupled as shown in FIG. 1. A client system 20 allows a user to communicate with server system 24 to design computer programs. Server system 24 manages applications for designing computer programs, such as a graphical user interface 30, a domain rule generation module 34, a business rule editor 38, modeling tools 40, a code generator 44, and a report generator 48. Database 28 stores data that may be used by server system 24. Database 28 may include, for example, domain rules 50, business rules 54, formal methods 58, a common modeling language 60, a model 64, and code 68.

In operation, domain rule generation module 34 generates a substantially complete set of domain rules 50 that includes invariant rules that may be used to define a domain. Business rule editor 38 is used to customize business rules 54 for a particular computer program. Modeling tools 40 may use domain rules 50, business rules 54, and formal methods 58, which may be expressed according to common modeling language 60, in order to generate model 64. A user may manipulate model 64 to design the computer program. Code generator 44 generates code 68 according to model 64, and may also operate to check code 68 and model 64 for syntax compliance and for consistency. Report generator 48 may be used to generate a report describing the computer program.

According to one embodiment, system 10 may operate to design a computer program using object-oriented technology. According to object-oriented technology, a computer program may be viewed as a collection of discreet objects representing entities that are self-contained collections of data structures and routines that interact with other objects. Object-oriented programming involves both analysis and design. Object-oriented analysis identifies component objects and system requirements, and describes how the component objects and system requirements interact to perform specific tasks. Typically, analysis attempts to reuse existing solutions. Design involves creating a computer program in which the objects may be efficiently adapted to perform the tasks.

According to the illustrated embodiment, client systems 20 may allow one or more users to concurrently design a computer program. Users may include designers, stakeholders, or any other person or identifier identifying a person. Stakeholders may include engineers from any of a number of fields such as the network, hardware, software, human factors, or database fields. Graphical user interface 30 allows users of client systems 20 to access applications of server system 24.

Domain rule generation module 34 generates domain rules 50. Domain rules 50 comprise invariant rules that define a domain that may be used to determine a problem space and a solution space. A substantially complete set of domain rules may anticipate substantially all possible applications of the domain, and may provide a framework from which substantially all solutions of the solution space may be generated. Domain rules 50 may be selected according to any suitable procedure to generate any suitable problem space, and may be generated through successive iterations of the design process.

TABLE 1 lists examples of domain rules 50 from accounting theory.

TABLE 1

| Domain Rule | Prescriptive Description |
| --- | --- |
| Duality | Offset each increment to resources with a corresponding decrement, and vice versa. Characterize increments by transferring in purchases and cash receipts and the corresponding decrements by transferring out sales and cash disbursements. |
| Accounting Equation | Ensure Assets = Liabilities + Owner's Equity. |
| Income Equation | Ensure Revenues − Expenses = Net Income (or Net Loss). |
| Accounting Period | Ensure transaction effective date between Accounting Period End Date and Accounting Period Begin Date. |
| Accrual | Calculate portion of expense or revenue based on when the corresponding purchase or sale event occurred, not when cash is received or disbursed. |
| Realization | Recognize when the expense occurred based on when the physical item or service was received. |
| Matching | Match revenue that occurred in an accounting period with associated expenses. |
| Money Measurement | Provide a common unit of measure for all calculations by translating all measurements into monetary units. |
| Entity | Define the boundaries of the organization for which accounts are kept and reports are made. |
| Going Concern | Prepare financial reports based on the assumption that the organization will continue its current operations indefinitely, not based on current liquidation value. |
| Cost | Value assets based on original cost, not current value and not value adjusted for inflation or deflation. |
| Consistency | Do not change the accounting method for a kind of event or asset from one accounting period to the next. |
| Conservatism | Recognize revenues and gains slower than expenses and losses. |
| Materiality | Do not measure or record events that are insignificant, applying consistency and conservatism to determine significance. |

TABLE 2 lists examples of domain rules 50 from military theory.

TABLE 2

| Domain Rule | Prescriptive Description |
| --- | --- |
| Set the Objective | Direct every military mission toward a clearly defined, decisive, and attainable objective. The proper objective in battle is the destruction of the enemy's combat forces. To do this, however, subordinate commanders must be given terrain objectives toward which they move. |
| Take the Offensive | Seize, retain, and exploit the initiative. Offensive action is the most effective and decisive way to attain a clearly defined common objective. |
| Mass the Effects | Mass the effects of synchronizing the employment of overwhelming combat power at the decisive place and time to gain the objective. Achieve military superiority at the decisive place and time. Mass is generally gained by Maneuver. |
| Use Forces Economically | Employ all combat power available in the most effective way possible to gain the objective. Allocate to secondary efforts minimum essential combat power. |
| Maneuver Combat Power | Place the enemy in a position of disadvantage through the flexible application of combat power. Position your military resources to favor the accomplishment of your mission. |
| Use Unity of Command | Designate a single decision maker responsible for all activities related to an operation. Focus all activity upon a single objective. |
| Be Secure | Never permit the enemy to acquire an unexpected advantage. |
| Use Surprise | Strike the enemy at a time, at a place, or in a manner for which he is unprepared. Accomplish your purpose before the enemy can effectively react. |
| Use Simplicity | Prepare clear, uncomplicated plans and clear, concise orders to ensure thorough understanding. |

Domain rule generation module 34 may identify the boundaries of a domain, and determine commonalities and variations among systems that meet the requirements. The boundaries and requirements may be defined for a domain in terms of the domain rules and functions. Functions may include related subfunctions, methods, processes, and procedures.

Business rules 54 comprise rules that may be customized to fit a particular application. Business rules may include, for example, rules of engagement, mission plans, or resource management rules. While domain rules 50 are invariant, business rules 54 are customizable. As an example, domain rules may comprise the principles of war, while business rules 54 comprise the rules of engagement.

TABLE 3 presents example business rules for accounting theory.

TABLE 3

| Business Rule | Prescriptive Instructions |
| --- | --- |
| Financial - Compliance with budget policies | If a request results in the total encumbered dollars greater than the budget, reject the request. |
| Operational - Compliance with authorization policies | If the amount for a purchase order exceeds the signature authority of the purchasing agent, reject the purchase order. |
| Regulatory - Compliance with tax law and regulation | If an asset type specified for a subsidiary ledger account does not match the asset type for the depreciation method, reject the transaction. |
| Fraud - Compliance with legal and policy requirements | Select all transactions for a specified subsidiary ledger account for a specified time period exceeding a specified dollar amount, then process the details of those transactions to detect patterns of fraudulent activity. |

TABLE 4 presents example business rules for military theory.

TABLE 4

| Rules of Engagement | Prescriptive Instructions |
|---|---|
| Use armed force as the last resort | When possible, the enemy will be warned first and allowed to surrender. Armed civilians will be engaged only in self-defense. Civilian aircraft will not be engaged without approval from above division level unless it is in self-defense. |
| Avoiding harming civilians unless necessary to save US lives | If possible, arrange for the evacuation of civilians prior to any US attack. If civilians are in the area, do not use artillery, mortars, armed helicopters, AC-130s, tube- or rocket-launched weapons, or M551 main guns against known or suspected targets without the permission of a ground maneuver commander, LTC or higher. If civilians are in the area, all air attacks must be controlled by a FAC or FO. If civilians are in the area, close air support (CAS), white phosphorus, and incendiary weapons are prohibited without approval from above division level. If civilians are in the area, do not shoot except at known enemy locations. If civilians are not in the area, you can shoot at suspected enemy locations. |
| Avoid harming civilian property unless necessary to save US lives | Public works such as power stations, water treatment plants, dams, or other utilities may not be engaged without approval from above division level. Hospitals, churches, shrines, schools, museums, or other historical or cultural site will not be engaged except in self-defense. |
| Treat all civilians and their property with respect and dignity | Before using privately owned property, check to see if any publicly owned property can be used. No requisitioning of civilian property without permission of a company-level commander and without giving a receipt. If an ordering officer can contract for the property, then do not requisition it. No looting. Do not kick down doors unless necessary. Do not sleep in their houses. If you must sleep in a privately owned building, have an ordering officer contract for it. |
| Control civilians engaged in looting | Senior person in charge may order warning shots. Use minimum force, but not deadly force, to detain looters. Defend Panamanian (and other) lives with minimum force including deadly force when necessary. |

Business rules 54 may be maintained at database 28 and customized by business rules editor 38. As an example, business rules 54 may be stored in a table, and a user may define a specific business rule 54 by revising the table. Business rule editor 38 may be used to perform security audits on business rules 54, analyze business rules 54, check new rules before adding them to database 28, and apply business rules 54 to decision support tools.

Formal methods 58 are rules that may be specified using a formal syntax such as first or second order logic or set theory. Graphical user interface 30 may be used to represent formal methods using a visual model.

Modeling tools 40 generate model 64 that represents the computer program under design, and may include, for example, nodes representing objects with operations performed by the computer program and branches representing relations among the objects. Code 68 comprises the code that executes the computer program represented by model 64.

Modeling tools 40 may comprise, for example, modeling tools provided by RATIONAL SOFTWARE such as RATIONAL ROSE REAL-TIME (RRT) modeling and code generation tool. Modeling tools 40 may also include tools that deal with requirements management, configuration management, testing, performance optimization, and documentation.

Model 64 may be actively linked to code 68 such that modeling tools 40 may provide dynamic views of model 64 to aid in the design of the computer program. For example, as code 68 is being run, a node of model 64 corresponding to code 68 that is being run may be highlighted, for example, the node may be displayed in a green color. As another example, if an inconsistency is found in code 68, a node of model 64 corresponding to code 68 having the inconsistency may be highlighted. For example, the node may be displayed in a red color. Visual indicators provided as the code executes may allow for visual verification and validation of code 68. Visual verification and validation used in conjunction with publish-and-subscribe interfaces may provide for assurance of preserving interoperability.

Different models 64 may present different views of the computer program. Models 64 may include, for example, a domain model that establishes the context of the program, a business model that establishes an abstraction of an organization associated with the program, a use case model that establishes the program's functional and non-functional requirements, and an analysis model that establishes a conceptual design of the program. The models may be actively linked with each other to reflect aspects of each other. For example, domain model may be actively linked with a lower-level model, such that the lower-level model requirements reflect the requirements of the domain model. Examples of views are described in more detail with reference to FIGS. 3 through 5.

Domain rules 50, business rules 54, and formal methods 58 may be expressed according to common modeling language 60, which provides for a common representation for data used by system 10. Common modeling language 60 may comprise, for example, the Unified Modeling Language (UML) supported by OBJECT MANAGEMENT GROUP.

Common modeling language 60 may be used to represent artifacts of the program design from semantic broadly-stated requirements through syntactic operating or executing components, and may be used to express artifacts from various stages of program design. Stages may include the early stages of design, for example, a request to automate an operation or to change an existing automated system, which are typically expressed as narrative descriptions. Subsequent phases such as concept exploration and definition, requirements analysis, program design and verification, and software coding and testing may also be expressed using common modeling language 60. Common modeling language 60 provides for artifacts that are understandable to users at any stage of design. Accordingly, users may determine whether the requirements have been captured by the program, and inconsistencies between stages may be more effectively resolved.

Code generator 44 in conjunction with modeling tools 40 may be used to iteratively generate code 68 for a computer program. Modeling tools 40 may be used to generate model 64 from which code 68 is generated at an iteration. Model 64 may be modified and new code 68 may be generated at successive iterations. At each iteration, detail may be added or requirements may be adjusted. Each iteration generates executable code 68 that may be tested in order to provide early views of the program, which may be used to confirm the proper operation of the program. Early feedback may serve to reduce risks by identifying problems early in the process.

Code generator 44 may include a debugger that may be used to check the syntax of code 68 and may also be used to detect logical inconsistencies between model 64 and code 68. Debugger may also be used to check whether code 68 correctly implements model 64 and satisfies formal statements.

Client system 20 and server system 24 may each operate on one or more computers and may include appropriate input devices, output devices, mass storage media, processors, memory, or other components for receiving, processing, storing, and communicating information according to the operation of system 10. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Client system 20 and server system 24 may be integrated or separated according to particular needs. For example, the present invention contemplates the functions of both client system 20 and server system 24 being provided using a single computer system, for example, a single personal computer. If client system 20 and server system 24 are separate, client system 20 may be coupled to server system 24 using one or more local area networks (LANS), metropolitan area networks (MANS), wide area networks (WANs), a global computer network such as the Internet, or any other appropriate wire line, wireless, or other links.

Database 28 may be local to or remote from server system 24, and may be coupled to server system 24 using one or more local area networks (LANs), metropolitan area networks (MANs), wide area networks (WANs), a global computer network such as the Internet, or any other appropriate wire line, wireless, or other links. Artifacts of database 28 may be actively linked in order to allow for more efficient generation of products from the artifacts. The active links may be used to integrate analysis, design, and implementation of computer programs.

Modifications, additions, or omissions may be made to the system without departing from the scope of the invention. Moreover, the operation of the system may be performed by more or fewer modules. For example, the operation of modeling tools 40 and code generator 44 may be performed by one module, or the operation of modeling tools 40 may be performed by more than one module. Additionally, functions may be performed using any suitable logic comprising software, hardware, other logic, or any suitable combination of the preceding.

FIG. 2 is a flowchart illustrating one embodiment of a method for designing a computer program. The method begins at step 70, where model 64 is displayed to a user. Domain rules 50 are accessed at step 71. The model represents a computer program designed by the user. Business rules 54 are displayed to the user at step 72. A business rule 54 is selected at step 74 in response to a selection by the user. Business rule 54 is customized at step 76 in response to selections by the user.

Business rule 54 is associated with model 64 at step 78. If a next business rule is to be selected at step 80, the method returns to step 74, where the next business rule is selected. If no next business rule is to be selected at step 80, the method proceeds to step 84. Code 68 is generated from model 64 at step 86. Modifications may be performed to model 64 during each iteration.

If there is a next iteration at step 88, the method returns to step 70, where business rules 54 are displayed. If there is no next iteration at step 88, the method proceeds to step 90, where the results are reported. The results may include code 68 generated from the finalized model 64. After reporting the results, the method terminates.

Modifications, additions, or omissions may be made to the method without departing from the scope of the invention. Additionally, steps may be performed in any suitable order without departing from the scope of the invention.

FIG. 3 is a diagram 100 illustrating the relationship between high-level artifacts stored at database 28. Diagram 100 may be displayed at client system 20. Folders 102 represent packages that may be used to collect elements including other packages in order to organize the development project. Arrows 104 represent a relationship among packages. For example, arrows 104 may represent cross-referencing among packages. Notes 106 represent information used during the development project. Lines 105 represent the connection to a folder to which notes 106 apply, and may be used to represent the association between business rules and a model.

According to the illustrated embodiment, model elements database folder 102*a* is related to a use cases folder 102*b*, a behavioral views folder 102*c*, a deployed system folder 102*d*, an operating or executing components folder 102*e*, and a structural view folder 102*f*. Deployed system folder 102*d* references operating or executing components 102*e*, which in turn references behavioral views folder 102*c*, which references use cases folder 102*b*.

A sources of requirements note 106*a* supplies information to a requirements identification methodology and a requirements manager 106*b*, which in turn supplies information to use cases folder 102*b*. Integrated documentation and configuration management tools 106*c* supplies abilities and information to model elements database 102*a*, and integrated target platform tools 106*d* supplies information and abilities to operating or executing components 102*e*.

Figure 4:
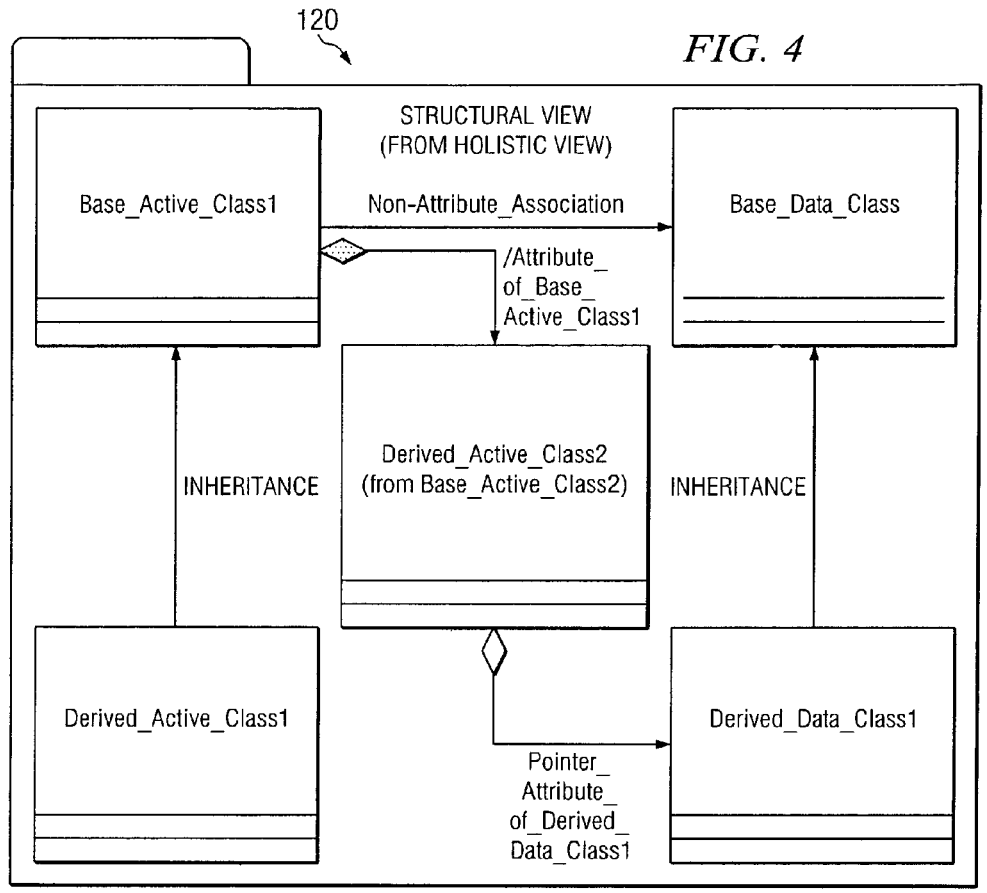
FIG. 4 is a diagram illustrating one embodiment of a structural view.
Figure 5:
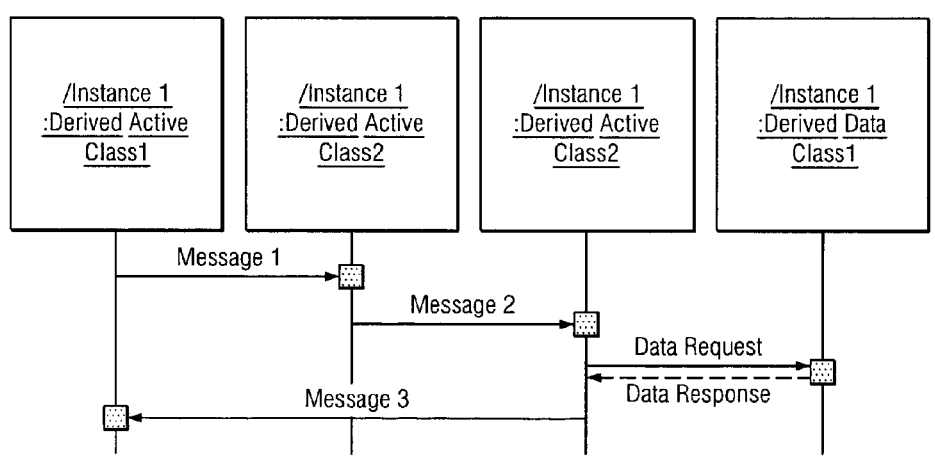
FIG. 5 is a diagram of one embodiment of a behavioral view.

FIGS. 4 and 5 illustrates example views that may be presented by modeling tools 40. FIG. 4 is a diagram illustrating one embodiment of a structural view 120. FIG. 5 is a diagram of one embodiment of a behavioral view 140. Views 120 and 140 are different views of the same program. As an example, derived active class 2 of structural view 120 corresponds to the instance of derived active class 2 of behavioral view 140.

Figure 6:
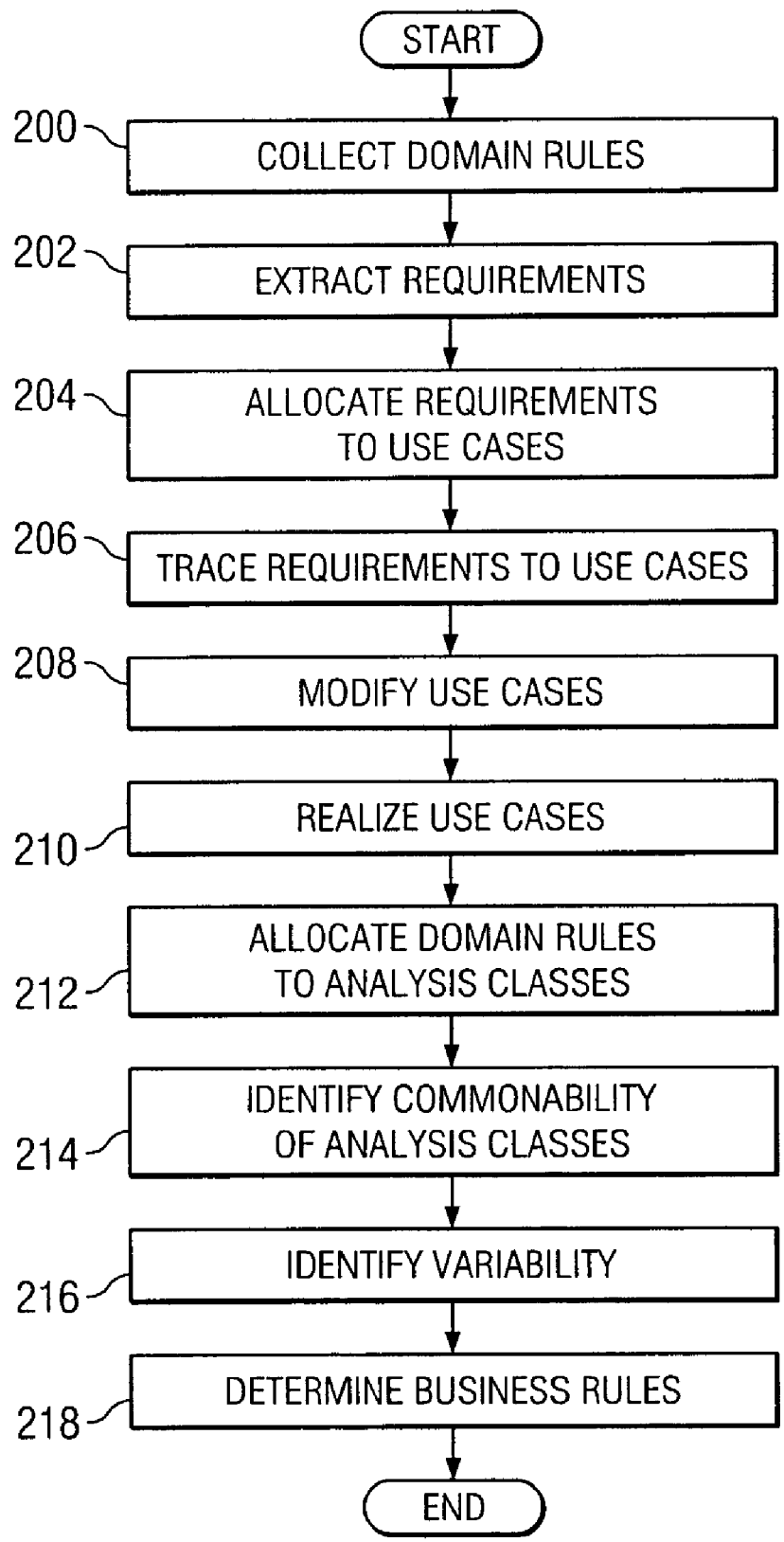
FIG. 6 is a flowchart illustrating one embodiment of a method for generating domain rules.

FIG. 6 is a flowchart illustrating one embodiment of a method for generating domain rules. The method generates domain rules by capturing the domain rules in use cases and analyzing the domain rules in use case realizations. Domain rules may be generated for domains such as accounting information systems and command, control, communications, computers, intelligence, surveillance, and reconnaissance (C4ISR) systems.

Domain rules are collected at step 200. An example of a domain rule for the accounting information system may include ensuring that debits and credits are balanced, and a domain rule for the C4ISR system may include place the enemy in a position of disadvantage through the flexible application of combat power. The domain rules may be gathered according to the Rational Unified Process (RUP) and the Unified Development Process (USDP).

Requirements are extracted from supplemental sources at step 202. Supplemental sources may include, for example: explicit definitions of the domain; traditional subdomains, functions, methods, processes, and procedures; and established processing cycles, business processes, or patterns. Explicit definitions of the domain may include, for example, natural or legislated laws, standards or regulations promulgated by professional organizations, or works by widely recognized researchers or practitioners. A domain may be divided into subdomains in accordance with the functions associated with the domain.

Processing cycles and patterns suggest what the function should accomplish and how the functions and the components within them should interact. TABLE 5 lists examples of processing cycles for an accounting information system.

TABLE 5

| Cycle Name | Description |
| --- | --- |
| Expenditures and cash disbursements | Purchase requisitions, purchase orders, supplier or vendor invoices, receiving reports, written checks. |
| Sales and cash receipts | Customer orders, bill of lading invoices, customer checks, remittance advices. |
| Payroll | Time cards, paychecks. |
| Production | Materials requisition, labor time cards, production order, operations list. |
| Facilities | Documents supporting the purchase of property, plants, and equipment. |
| General Ledger | Adjusting, closing, and correcting entries and input from various feeder cycles, for example, expenditure and sales. |
| Financing | Capital raising, for example, bank notes, bond agreements, common stock issuances. |
| Investment | Stocks, bonds, CDs, repurchase agreements. |

TABLE 6 lists examples of patterns for the C4ISR system.

TABLE 6

| Name | Description |
| --- | --- |
| Plan | Translation of higher Commander's intent into specific Courses Of Action (COAs) in a compressed plan cycle for preparation and execution by subordinate elements. Define battle space areas of operation for synchronization and control. Generate alternate courses of action and evaluate against most likely and dangerous adversary actions. Develop synchronized schedule of tasks and activities for subordinates to prepare and execute. Develop integrated, combined effect operations plan to include all the battlefield functional areas. |
| Prepare | Activities by the unit before execution to improve its ability to conduct the planned operation, including plan refinement, force protection, rehearsal, reconnaissance, integration and coordination of warriors and resources, inspections, and movement to planned locations. |
| Execute | Apply combat power to accomplish the planned mission, exercise control through assessment of battle space to understand the situation in order to make execution and adjustment decisions for battle management. |
| Assess | Monitor and evaluate the current situation and progress of an operation on a continual basis throughout planning, preparation and execution. Evaluate against criteria of success to make decisions and adjustments. |

The requirements are allocated to use cases at step 204. The requirements may include functional and non-functional domain rules. Functional domain rules comprise rules that are implemented by a specific function, and non-functional domain rules comprise system properties that are not directly implemented by a specific function. Non-functional domain rules may be allocated to use cases along with other non-functional requirements for realization, and may be allocated to use cases that they affect. For example, a performance requirement may be allocated to a use case that has functional requirements that would affect the performance criteria. If the affected use cases are subsequently realized, the non-functional requirements may be allocated to the analysis classes as tagged values, constraints, or documentation notations.

Requirements are traced to use cases at step 206 to determine if the domain rules have been allocated to appropriate use cases. The use cases are realized through collaborations at step 210 in order to identify any gaps at the next level. If capabilities from the supplemental sources seem to go beyond the domain rules, it may be determined whether implicit domain rules are imbedded in the capabilities or if the capabilities are unnecessary, for example, they lie outside the domain, they are redundant, or they are obsolete.

Use cases may be modified or added at step 208. The addition or modification may occur at this iteration or subsequent iterations. Use cases are realized at step 210 by identifying analysis classes and creating collaborations. Use cases may be realized for some requirements before other requirements. For example, use cases may be realized for requirements related to requests for initiating the development of the program. These requirements may be solution-oriented, and may tend to focus on a specific application. The other requirements, however, may be considered in order to complete the problem space. Domain rules are allocated to analysis classes at step 212.

Commonalties of analysis classes are identified at step 214. Commonalties are identified by determining the analysis classes that appear in multiple use cases. Stable variability of the analysis classes are identified at step 216 may be identified through subsequent analysis and design of the common classes. Business rules that capture the volatile variability of the program are determined at step 218. After determining the business rules, the method terminates.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that a complete set of domain rules is determined prior to generation of the final code. The complete set may be used to define a problem space, providing for more efficient and effective design of a computer program.

Although an embodiment of the invention and its advantages are described in detail, a person skilled in the art could make various alterations, additions, and omissions without departing from the spirit and scope of the present invention as defined by the appended claims.

What is claimed is:

1. A method for designing a computer program, comprising:
   accessing a substantially complete set of domain rules, each domain rule being invariant and expressed as a narrative description;
   defining a domain from the domain rules, the domain used to determine a problem space and a solution space, substantially all solutions of the solution space can be generated from the substantially complete set of domain rules;
   identifying one or more requirements of the domain from one or more supplemental sources;
   generating a model that establishes the requirements of the domain;
   allocating the domain rules to a plurality of use cases and realizing the use cases, the realization comprising identifying a plurality of analysis classes of the use cases;
   assessing the domain rules in accordance with the realization;

identifying a plurality of commonalities of the identified analysis classes by determining the identified analysis classes that appear in multiple use cases of the plurality of use cases;
determining one or more business rules based on variability identified in the identified common analysis classes, each business rule being variable;
associating the determined one or more business rules with the model; and
generating code corresponding to the model in order to design a computer program.

2. The method of claim 1, further comprising:
checking a syntax of the code; and
providing a notification if a syntax error is detected.

3. The method of claim 1, further comprising:
checking a logical consistency of the code; and
providing a notification if a logical inconsistency is detected.

4. The method of claim 1, further comprising:
checking a compatibility between the model and the code; and
providing a notification if an inconsistency is detected.

5. The method of claim 1, wherein the model is expressed according to a modeling language.

6. Logic for designing a computer program, the logic embodied in a computer-readable medium and when executed by a computer operable to:
access a substantially complete set of domain rules, each domain rule being invariant and expressed as a narrative description;
define a domain from the domain rules, the domain used to determine a problem space and a solution space, substantially all solutions of the solution space can be generated from the substantially complete set of domain rules;
identify one or more requirements of the domain from one or more supplemental sources;
generate a model that establishes the requirements of the domain;
allocate the domain rules to a plurality of use cases and realizing the use cases, the realization comprising identifying a plurality of analysis classes of the use cases;
assess the domain rules in accordance with the realization;
identify a plurality of commonalities of the identified analysis classes by determining the identified analysis classes that appear in multiple use cases of the plurality of use cases;
determine one or more business rules based on variability identified in the identified common analysis classes, each business rule being variable;
associate the one or more business rules with the model; and
generate code corresponding to the model in order to design a computer program.

7. The logic of claim 6, further operable to:
collect the domain rules and the business rules;
allocate the domain rules and the business rules to a plurality of use cases;
realize the use cases; and
assess the domain rules and the business rules in accordance with the realization.

8. The logic of claim 6, further operable to:
check a syntax of the code; and
provide a notification if a syntax error is detected.

9. The logic of claim 6, further operable to:
check a logical consistency of the code; and
provide a notification if a logical inconsistency is detected.

10. The logic of claim 6, further operable to:
check a compatibility between the model and the code; and
provide a notification if an inconsistency is detected.

11. The logic of claim 6, wherein the model is expressed according to a modeling language.

12. A system for designing a computer program, comprising:
a database operable to store a substantially complete set of domain rules, each domain rule being invariant and expressed as a narrative description; and
a server coupled to the database and operable to:
define a domain from the domain rules, the domain used to determine a problem space and a solution space, substantially all solutions of the solution space can be generated from the substantially complete set of domain rules;
identify one or more requirements of the domain from one or more supplemental sources;
generate a model that establishes the requirements of the domain;
allocate the domain rules to a plurality of use cases and realizing the use cases, the realization comprising identifying a plurality of analysis classes of the use cases;
assess the domain rules in accordance with the realization;
identify a plurality of commonalities of the identified analysis classes by determining the identified analysis classes that appear in multiple use cases of the plurality of use cases;
determine one or more business rules based on variability identified in the identified common analysis classes, each business rule being variable;
associate the one or more business rules with the model; and
generate code corresponding to the model in order to design a computer program.

13. The system of claim 12, the server further operable to:
collect the domain rules and the business rules;
allocate the domain rules and the business rules to a plurality of use cases;
realize the use cases; and
assess the domain rules and the business rules in accordance with the realization.

14. The system of claim 12, the server further operable to:
check a syntax of the code; and
provide a notification if a syntax error is detected.

15. The system of claim 12, the server further operable to:
check a logical consistency of the code; and
provide a notification if a logical inconsistency is detected.

16. The system of claim 12, the server further operable to:
check a compatibility between the model and the code; and
provide a notification if an inconsistency is detected.

17. The system of claim 12, wherein the model is expressed according to a modeling language.

18. A system for designing a computer program, comprising:
means for accessing a substantially complete set of domain rules, each domain rule being invariant and expressed as a narrative description;
means for defining a domain from the domain rules, the domain used to determine a problem space and a solution space, substantially all solutions of the solution space can be generated from the substantially complete set of domain rules;
means for identifying one or more requirements of the domain from one or more supplemental sources;

means for generating a model that establishes the requirements of the domain;

means for allocating the domain rules to a plurality of use cases and realizing the use cases, the realization comprising identifying a plurality of analysis classes of the use cases;

means for assessing the domain rules in accordance with the realization;

means for identifying a plurality of commonalities of the identified analysis classes by determining the identified analysis classes that appear in multiple use cases of the plurality of use cases;

means for determining one or more business rules based on variability identified in the identified common analysis classes, each business rule being variable;

means for associating the one or more business rules with the model; and means for generating code corresponding to the model in order to design a computer program.

19. A method for designing a computer program, comprising:

collecting a substantially complete set of domain rules for a military theory, allocating the domain rules to a plurality of use cases, realizing the use cases, the realization comprising identifying a plurality of analysis classes of the use cases assessing the domain rules in accordance with the realization, and accessing the domain rules, each domain rule being invariant and expressed as a narrative description, the plurality of domain rules comprising a plurality of military theory domain rules setting an objective to destroy an enemy's combat forces;

defining a domain from the domain rules, the domain used to determine a problem space and a solution space, substantially all solutions of the solution space can be generated from the substantially complete set of domain rules;

identifying one or more requirements of the domain from one or more supplemental sources;

generating a model that establishes the requirements of the domain;

identifying a plurality of commonalities of the identified analysis classes by determining the identified analysis classes that appear in multiple use cases of the plurality of use cases;

determining a plurality of business rules for the military theory based on variability identified in the identified common analysis classes;

displaying the plurality of business rules for the military theory, each business rule being variable, the plurality of business rules comprising a plurality of rules of engagement;

selecting one or more rules of engagement in response to a user selection;

customizing the one or more rules of engagement;

associating the one or more rules of engagement with the model;

associating the military theory domain rules with the model generating a code corresponding to the model in order to design a computer program;

checking a syntax of the code, and providing a notification if a syntax error is detected;

checking a logical consistency of the code, and providing a notification if a logical inconsistency is detected; and checking a compatibility between the model and the code, and providing a notification if an inconsistency is detected.

20. A method for managing rules for designing a computer program, comprising:

accessing a plurality of military theory rules for a military theory;

accessing a plurality of legislated laws associated with the military theory;

identifying military theory rules required by the laws as a substantially complete set of domain rules of the military theory, each domain rule being invariant and expressed as a narrative description;

defining a domain from the domain rules, the domain used to determine a problem space and a solution space, substantially all solutions of the solution space can be generated from the substantially complete set of domain rules;

identifying one or more requirements of the domain from one or more supplemental sources;

generating a model that establishes the requirements of the domain;

designating the other military theory rules as a plurality of business rules of the military theory, the business rules comprising a plurality of rules engagement, each business rule being variable;

allocating the domain rules to a plurality of use cases and realizing the use cases, the realization comprising identifying a plurality of analysis classes of the use cases;

identifying a plurality of commonalities of the identified analysis classes by determining the identified analysis classes that appear in multiple use cases of the plurality of use cases;

determining one or more of the business rules based on variability identified in the identified common analysis classes;

assessing the domain rules and the business rules in accordance with the realization; and providing a rule of engagement from the rules of engagement in response to a request for the business rule.

21. The method of claim 20, further comprising:

customizing the provided rule of engagement;

associating the customized rule of engagement with the model; and generating a code corresponding to the model in order to design a computer program.

22. The method of claim 20, further comprising:

associating the domain rules with the model; and generating a code corresponding to the model in order to design a computer program.

23. The method of claim 20, further comprising:

allocating the domain rules and the business rules to a plurality of use cases;

realizing the use cases; and assessing the domain rules and the business rules in accordance with the realization.

24. A system for managing rules for designing a computer program, comprising:

a database operable to:
store a plurality of military theory rules for a military theory; and
store a plurality of legislated laws associated with the military theory; and a server coupled to the database and operable to:
identify military theory rules required by the laws as a substantially complete set of domain rules of the military theory, each domain rule being invariant and expressed as a narrative description;
define a domain from the domain rules, the domain used to determine a problem space and a solution space, substantially all solutions of the solution space can be generated from the substantially complete set of domain rules;
identify one or more requirements of the domain from one or more supplemental sources;
generate a model that establishes the requirements of the domain;
designate the other military theory rules as a plurality of business rules of the military theory, the business rules comprising a plurality of rules engagement, each business rule being variable;
allocate the domain rules to a plurality of use cases and realizing the use cases, the realization comprising identifying a plurality of analysis classes;
identify a plurality of commonalities of the identified analysis classes by determining the identified analysis classes that appear in multiple use cases of the plurality of use cases;
determine one or more business rules of the plurality of business rules based on variability identified in the identified common analysis classes;
assess the domain rules and the business rules in accordance with the realization; and
provide a rule of engagement from the rules of engagement in response to a request for the business rule.

25. The system of claim 24, wherein the server is further operable to:
customize the provided rule of engagement;
associate the customized rule of engagement with the model; and
generate a code corresponding to the model in order to design a computer program.

26. The system of claim 24, wherein the server is further operable to:
associate the domain rules with the model; and
generate a code corresponding to the model in order to design a computer program.

27. The system of claim 24, wherein the server is further operable to:
allocate the domain rules and the business rules to a plurality of use cases;
realize the use cases; and
assess the domain rules and the business rules in accordance with the realization.

28. Logic for managing rules for designing a computer program, the logic embodied in a computer-readable medium and when executed by a computer operable to:
access a plurality of military theory rules for a military theory;
access a plurality of legislated laws associated with the military theory;
identify military theory rules required by the laws as a substantially complete set of domain rules of the military theory, each domain rule being invariant and expressed as a narrative description;
define a domain from the domain rules, the domain used to determine a problem space and a solution space, substantially all solutions of the solution space can be generated from the substantially complete set of domain rules;
identify one or more requirements of the domain from one or more supplemental sources;
generate a model that establishes the requirements of the domain;
designate the other military theory rules as a plurality of business rules of the military theory, the business rules comprising a plurality of rules engagement, each business rule being variable;
allocate the domain rules to a plurality of use cases and realizing the use cases, the realization comprising identifying a plurality of analysis classes;
identify a plurality of commonalities of the identified analysis classes by determining the identified analysis classes that appear in multiple use cases of the plurality of use cases;
determining one or more business rules of the plurality of business rules based on variability identified in the identified common analysis classes;
assess the domain rules and the business rules in accordance with the realization; and
provide a rule of engagement from the rules of engagement in response to a request for the business rule.

29. The logic of claim 28, further operable to:
customize the provided rule of engagement;
associate the customized rule of engagement with the model; and
generate a code corresponding to the model in order to design a computer program.

30. The logic of claim 28, further operable to:
associate the domain rules with the model; and
generate a code corresponding to the model in order to design a computer program.

31. The logic of claim 28, further operable to:
allocate the domain rules and the business rules to a plurality of use cases;
realize the use cases; and
assess the domain rules and the business rules in accordance with the realization.

32. A system for managing rules for designing a computer program, comprising:
means for accessing a plurality of military theory rules for a military theory;
means for accessing a plurality of legislated laws associated with the military theory;
means for identifying military theory rules required by the laws as a substantially complete set of domain rules of the military theory, each domain rule being invariant and expressed as a narrative description;
means for defining a domain from the domain rules, the domain used to determine a problem space and a solution space, substantially all solutions of the solution space can be generated from the substantially complete set of domain rules;
means for identifying one or more requirements of the domain from one or more supplemental sources;
means for generating a model that establishes the requirements of the domain;
means for designating the other military theory rules as a plurality of business rules of the military theory, the business rules comprising a plurality of rules engagement, each business rule being variable;
means for allocating the domain rules to a plurality of use cases and realizing the use cases, the realization comprising identification of a plurality of analysis classes;
means for identifying a plurality of commonalities of the identified analysis classes by determining the identified analysis classes that appear in multiple use cases of the plurality of use cases;
means for determining one or more business rules of the plurality of business rules based on variability identified in the identified common analysis classes;

means for assessing the domain rules and the business rules in accordance with the realization; and means for providing a rule of engagement from the rules of engagement in response to a request for the business rule.

33. A method for managing rules for designing a computer program, comprising:

accessing a plurality of military theory rules for a military theory;

accessing a plurality of legislated laws associated with the military theory;

identifying military theory rules required by the laws as a substantially complete set of domain rules of the military theory, each domain rule being invariant and expressed as a narrative description;

designating the other military theory rules as a plurality of business rules of the military theory, the business rules comprising a plurality of rules engagement, each business rule being variable;

defining a domain from the domain rules, the domain used to determine a problem space and a solution space, substantially all solutions of the solution space can be generated from the substantially complete set of domain rules;

identifying one or more requirements of the domain from one or more supplemental sources;

generating a model that establishes the requirements of the domain;

allocating the domain rules and the business rules to a plurality of use cases;

realizing the use cases, the realization comprising identification of a plurality of analysis classes;

identifying a plurality of commonalities of the identified analysis classes by determining the identified analysis classes that appear in multiple use cases of the plurality of use cases;

determining one or more business rules of the plurality of business rules based on variability identified in the identified common analysis classes;

assessing the domain rules and the business rules in accordance with the realization;

storing the rules of engagement;

providing a rule of engagement from the stored rules of engagement in response to a request for the business rule;

customizing the provided rule of engagement;

associating the customized rule of engagement with the model;

associating the domain rules with the model; and generating a code corresponding to the model in order to design a computer program.

* * * * *